United States Patent
Decker et al.

(10) Patent No.: US 8,375,319 B2
(45) Date of Patent: Feb. 12, 2013

(54) PROGRESS INDICATOR FOR LOADING DYNAMICALLY-SIZED CONTENTS

(75) Inventors: Kevin Decker, San Jose, CA (US); Timothy G. Hatcher, Tracy, CA (US); Michael P. Thole, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 418 days.

(21) Appl. No.: 12/479,577

(22) Filed: Jun. 5, 2009

(65) Prior Publication Data

US 2010/0313159 A1    Dec. 9, 2010

(51) Int. Cl.
 *G06F 3/48* (2006.01)
(52) U.S. Cl. ......... 715/772; 715/760; 715/700; 715/764
(58) Field of Classification Search .................. 715/772
See application file for complete search history.

(56) References Cited

U.S. PATENT DOCUMENTS

| | | | |
|---|---|---|---|
| 5,301,348 A * | 4/1994 | Jaaskelainen | 714/46 |
| 6,100,887 A * | 8/2000 | Bormann et al. | 715/764 |
| 6,339,780 B1 * | 1/2002 | Shell et al. | 715/207 |
| 6,639,687 B1 * | 10/2003 | Neilsen | 358/1.14 |
| 6,874,130 B1 * | 3/2005 | Baweja et al. | 715/805 |
| 6,901,558 B1 * | 5/2005 | Andreas et al. | 715/772 |
| 6,931,439 B1 * | 8/2005 | Hanmann et al. | 709/219 |
| 6,941,522 B2 * | 9/2005 | Brown | 715/772 |
| 7,512,895 B2 * | 3/2009 | Snover et al. | 715/772 |
| 7,826,078 B2 * | 11/2010 | Okamoto et al. | 358/1.15 |
| 7,827,505 B2 * | 11/2010 | Anzelde et al. | 715/772 |
| 7,882,173 B2 * | 2/2011 | Hirsch et al. | 709/203 |
| 2001/0055017 A1 * | 12/2001 | Ording | 345/440 |
| 2002/0093923 A1 * | 7/2002 | Bouet | 370/328 |
| 2005/0223341 A1 * | 10/2005 | Repka | 715/851 |
| 2007/0136679 A1 * | 6/2007 | Yang | 715/772 |
| 2008/0256473 A1 * | 10/2008 | Chakra et al. | 715/772 |
| 2008/0256474 A1 * | 10/2008 | Chakra et al. | 715/772 |
| 2008/0307348 A1 * | 12/2008 | Jones et al. | 715/772 |
| 2009/0094546 A1 * | 4/2009 | Anzelde et al. | 715/772 |
| 2009/0254850 A1 * | 10/2009 | Almeida | 715/772 |
| 2009/0327468 A1 * | 12/2009 | Hirsch et al. | 709/223 |
| 2010/0162139 A1 * | 6/2010 | Beebe et al. | 715/760 |
| 2011/0055683 A1 * | 3/2011 | Jiang | 715/234 |

OTHER PUBLICATIONS

Windows Vista Enterprise SP1 by Microsoft, released on Feb. 4, 2008, 5 pages.*
"Possible to move the status bar to the top of the browser", discussion thread posted at MozillaZine <http://forums.mozillazine.org> on Jan. 7, 2007, 3 pages.*
"3 different wasy to display progress in ASP.NET AJAX application", discussion thread posted at DotNetCurry <http://forums.mozillazine.org> on Nov. 10, 2008, 22 pages.*
Working screenshot of windows explorer of Windows Vista Enterprise SP1 by Microsoft, released on Feb. 4, 2008, 5 pages.*

(Continued)

*Primary Examiner* — William Bashore
*Assistant Examiner* — Reza Nabi
(74) *Attorney, Agent, or Firm* — Schwegman Lundberg & Woessner, P.A.

(57) ABSTRACT

A new resource address is registered in response to input received from a user. The user is then notified when a visually non-empty portion of content from the resource address has been loaded into a viewing area of the content viewing application. The notification cues the user to direct his/her attention to the viewing area of the content viewing application.

18 Claims, 4 Drawing Sheets

OTHER PUBLICATIONS

Beebe et al, Multi-function status indicator for content receipt by a mobile computing device, U.S. Appl. No. 61/139,525, filed Dec. 19, 2008, 26 pages.*

IBM, "Method to Improve the Accuracy of Progress Indicators", http://www.ip.com/pubview/IPCOM000140792D, retrieved on Jun. 1, 2009, (Sep. 20, 2006), 2 pages.

* cited by examiner

STATE 202

STATE 204

STATE 206

PROGRESS INDICATOR FOR LOADING DYNAMICALLY-SIZED CONTENTS

FIELD

Embodiments of the invention related to web browsers, and more particularly, to progress indicators used to indicate loading progress of content in a web browser.

BACKGROUND

One of the increasingly common functions of modern personal computers is providing access to and presenting Internet content. Internet content is typically provided and presented to users by means of an Internet browser, such as Safari®, made by Apple, Inc. of Cupertino, Calif.; or Firefox®, made by Mozilla Corporation in Mountain View, Calif.; or Internet Explorer®, made by Microsoft Corporation in Redmond, Wash. Internet browsing applications are also referred to herein as Internet browsers or, simply, web browsers (where "web" refers to the world-wide web). Similarly, Internet content is also referred to as web content herein.

The increase in web browser usage has led to a demand for enhanced web browsing speeds, both in the form of network connection speeds and optimizations to Internet browser applications. To aid in the user experience of web browsing (also referred to herein as web browsing), web browser applications frequently include some type of progress indicator that indicates the download progress for a particular web page, or other web content. The progress indicator is intended to give the user some indication as to the progress of the web page download. For example, some web browsers have a progress bar that is intended to grow progressively longer as more of the content of a web page is loaded and rendered to the screen.

However, one of the problems with progress indicators on web browsers is that they fail to accurately reflect the true progress made towards downloading web content. In other words, the progress bar on many traditional web browsers is arbitrary—it is designed to give the user the perception that progress is being made to appease the user's desire for fast downloads. These web browsers are arbitrary inasmuch as the progress bar, for example, grows in length without any direct connection to the actual download progress of the web page content. For example, in some browsers, as soon as a user clicks on a link or enters a new web address, the progress indicator (e.g., a progress bar) will automatically show that 10 percent of the content has been downloaded, even if 5 percent or even zero percent has actually been downloaded.

Additionally, it is common for a progress indicator to show 75 percent of the requested content has been downloaded when, in actuality the content viewing area of the display screen on the web browser shows far less than 75 percent of the content. In fact, in some cases, the progress bar might indicate that the majority of the content has been downloaded when nothing is actually being displayed on the screen. Thus, one of the challenges of providing a good user experience within an web browser is to be able to show the user an accurate representation of the progress being made on a particular download of web content.

SUMMARY OF THE DESCRIPTION

When a user of a web browser application enters a new web address, or clicks on a link, the resource address associated with that link is registered by the web browser. In response, the web browser provides an immediate indication to the user that the user's request has been registered. A progress indicator is used to provide the indication to the user.

In response to receiving a request for web content, the web browser application begins to retrieve the requested content and displays the progress indicator. The web browser monitors its own progress in rendering downloaded content. When it is determined that a usable portion of the content has been rendered to the display screen, the progress indicator changes so as to cue the user to turn his/her attention to the content viewing area of the web browser. When the web page has been completely downloaded and rendered to the display screen in the content viewing area of the web browser, the progress indicator changes again to indicate this status.

BRIEF DESCRIPTION OF DRAWINGS

The following description includes discussion of figures having illustrations given by way of example of implementations of embodiments of the invention. The drawings should be understood by way of example, not by way of limitation. As used herein, references to one or more "embodiments" are to be understood as describing a particular feature, structure, or characteristic included in at least one implementation of the invention. Thus, phrases such as "in one embodiment" or "in an alternate embodiment" appearing herein describe various embodiments and implementations of the invention, and do not necessarily all refer to the same embodiment. However, they are also not necessarily mutually exclusive.

DETAILED DESCRIPTION

Figure 1:
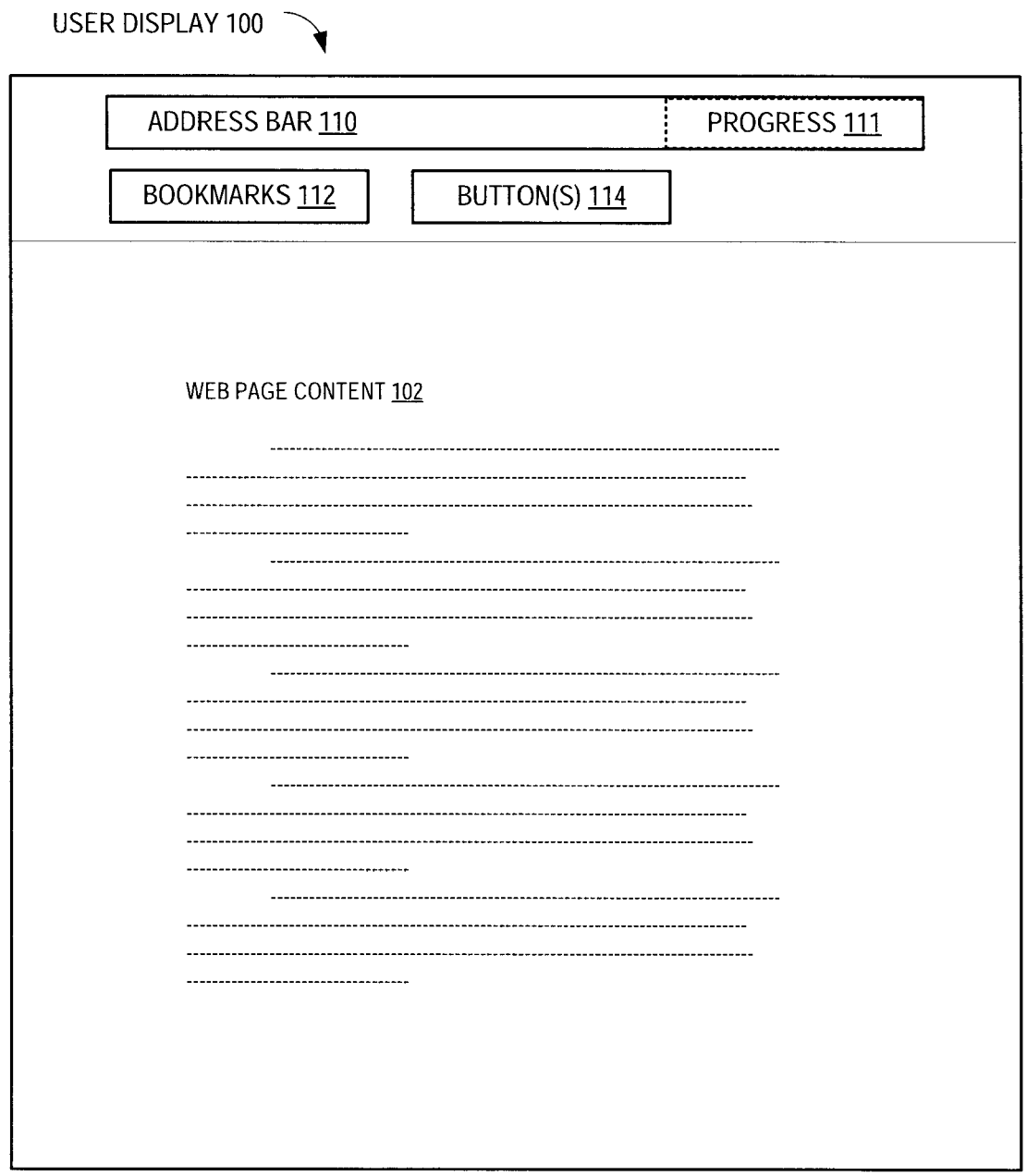
FIG. 1 is a block diagram according to various embodiments.

As provided herein, various methods and systems enable progress indicator improvements that provide more accurate status information regarding download progress of Internet content. When a user types in a new address into a web browser, or clicks a link on a web page, the web browser application retrieves the information associated with that link, or address. The web browser provides a first indication to a user when the resource address has been registered by the application and the application has started to retrieve the requested web content.

When the web browser application determines that a first visually non-empty layout of the content viewing area in the web browser application has been generated and rendered, then the progress indicator changes in such a way that it signals the user that usable content is now visible on the display screen. As used herein, usable content includes any content with which a human user can interact or process (e.g., readable text, a visible portion of an image, etc.). Thus, a "first visually non-empty layout" refers to the first layout of the requested web page generated by the web browser application that shows something other than a blank screen. For example, the first visually non-empty layout might include some text from the requested web page. It is not necessary that all of the text from a requested web page be displayed, but a visually non-empty layout requires that at least some of the text has been rendered for display. Similarly, a visually non-empty layout might include a portion of an image displayed on the screen. Again, the entire image does not need to be displayed to be "visually interesting;" however, some portion of the image must be displayed to be considered visually interesting.

In various embodiments, when the web browser application retrieves content from a particular address, the browser application parses the content (e.g., text, images, scripts, etc.) into a tree structure. The application then continues building an internal structure for displaying the retrieved content onto the screen within the web browser. Once enough of the content has been retrieved and enough of the structure has been internally built, the web browser engine builds an incremental layout of the web page. In various embodiments, when any part of that layout includes anything other than a non-empty set of data, then it can be ascertained that there is usable content available on the display screen.

In addition to text and images, usable content may also include canvas elements (e.g., for video games, etc.), and plug-ins (such as Flash® plug-ins, etc.). As used herein, a canvas element refers to any element that allows for dynamic scriptable rendering of bitmap images. Again, when any part of the layout generated by the web browser engine includes a non-empty set of data, then it is determined that the content viewing area of the web browser has interesting, or usable, content.

When it is determined that there is interesting, or usable, content displayed in the web browser, a progress indicator state is altered to reflect the availability of usable content in the content viewing area of the web browser application. For example, when a web page is first requested, a progress indicator on the browser may show a status that indicates the web page is loading. The progress indicator may include other information or display elements (graphics, etc.). In various embodiments, upon determining that usable content has been rendered for display in the content viewing area of the browser, the progress indicator is altered to provide a visual cue to the user to direct his/her attention to the content viewing area of the web browser. For example, the progress indicator might initially show that the web page is loading by displaying "Loading . . . " in a light-colored font with a dark-colored background. When usable content is available on the display screen, that progress indicator might change to display "Loading . . . " in a dark-colored font with a light-colored background. In other words, the color scheme (or other visually noticeable element) of the progress indicator is changed to cue the user that enough of the requested content is available on the screen to justify the user turning his/her attention to the content viewing portion of the web browser.

When the full web page is downloaded and available for display in the content viewing area, the progress indicator might be altered again, in various embodiments. For example, if the progress indicator was changed to show a lighter-colored background when some usable content was available for display, the background might change again to a different color (e.g., white) when the content is fully loaded. In some embodiments, the progress indicator might be hidden or changed to a transparent state when the full web page is downloaded and available for display.

It is important to note that the change in the appearance of the progress indicator is not arbitrary, or presumptive. Instead, the visual alterations to the progress indicator are directly correlated with measured and/or detected changes in the content that is actually viewable by the user on the web browser application. It should also be noted that cues other than visual cues could be used to indicate a noteworthy change in download progress. For example, rather than changing a background color of a progress indicator, the web browser could provide an audible sound corresponding to various states of progress in downloading and rendering content.

In addition to the various embodiments described above, the progress indicator might further include an animated display to cue the user that progress is being made on the download of the requested web page content. For example, recent versions of the Safari® browser offered by Apple, Inc., of Cupertino, Calif., include an animated circular gear that appears to be spinning while web page content is being downloaded. In other web browsers, other types of similar animation are used to indicate active progress on a particular web page download. In various embodiments, a web browser application measures dynamic throughput of data being downloaded by the application. In other words, the web browser application measures the rate at which data is actually being received and rendered, as opposed to the rate at which it is capable of retrieving data (e.g., the data connection rate). Based on the actual data throughput to the web browser, various embodiments alter the animation rate of progress indicator elements (such as the Safari® spinning gear) to reflect the actual throughput rate of data. In other words, the spinning gear might appear to spin faster when the actual throughput of data is higher and the spinning gear might spin slower when the actual throughput of data is slower. In this way, the user is given better information as to the progress of a web page download, thereby enhancing the web browsing experience.

FIG. 1 illustrates a web browser application display according to various embodiments. User display 100 includes a section of the display that contains the address bar 110, bookmarks 112, and various browser buttons 114. Address bar 110 includes a section for a progress indicator 111. In addition, user display 100 includes a content viewing area specifically dedicated to displaying web page content 102. As shown, progress indicator 111 is a part of address bar 110 that is shown at the top of user display 100. In other embodiments, progress indicator 11 can be included in different locations within display 100. For example, progress indicator 111 might detached from address bar 110, yet near address bar 110. In other embodiments, progress indicator 111 might be shown at the bottom of user display 100, or at the side. It is also in some embodiments that progress indicator 111 can be shown in the area of web page content 102 (e.g., as a transparent overlay).

Figure 2:
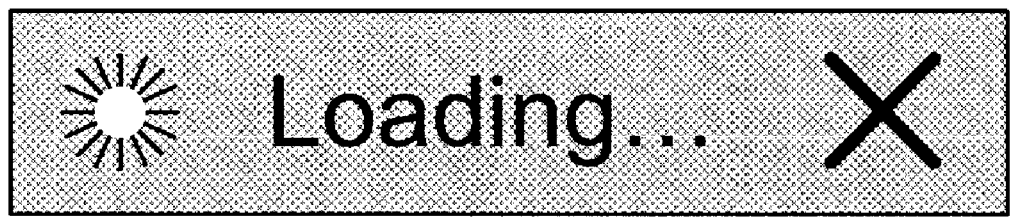
FIG. 2 is a block diagram according to various embodiments.
Figure 2:
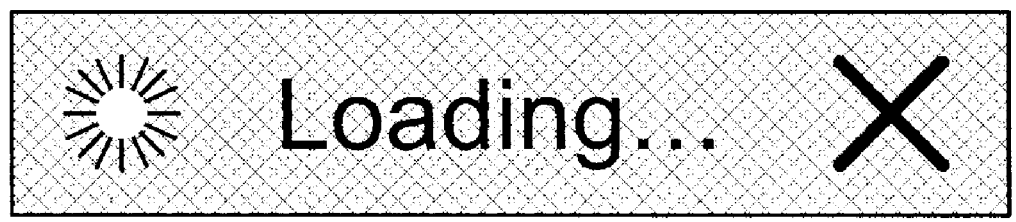
Figure 2:

FIG. 2 illustrates an embodiment of different states for a progress indicator (e.g., progress indicator 111 of FIG. 1) in a web browser. As shown, state 202 includes an element resembling a spinning gear, an element indicating that the web page is loading, and an "X" that allows a user to cancel the current download. In particular, state 202 shows progress indicator with a darker background. State 204 shows the same progress indicator with a lighter background. The difference in the backgrounds is intended to be visually noticeable such that a user will readily distinguish the difference between the two backgrounds and, hence, the difference between the two states, 202 and 204. In various embodiments, state 202 might indicate to a user that the web browser is actively retrieving the requested web page content, but that none of the requested content is currently available for viewing on the web browser display. In contrast, state 204 might indicate that some portion of usable content is available for viewing on the web browser application. In this way, as a user clicks a new link (or types in a web address and hits "return") and begins to wait for the page to download, state 202 and state 204 can provide a more accurate cue to the user that different levels of progress have been made towards of downloading the requested page.

State 206 illustrates an embodiment of a state where the requested web page has been fully downloaded and is fully available for display on the viewable screen. In other words, state 206 indicates that loading of the web page is complete. Thus, there is no loading indicator, no spinning gear, and no "X" that a user can click to stop the downloading, because the downloading is already complete. State 206 does include a re-load icon that allows the user to click to re-load the web page, if desired. The particular elements of states 202, 204 and 206 are not intended to be limiting in any way. One of skill in the art will recognize that any variety of distinct display elements could be used to indicate different progress states. However, it is important to have sufficient distinction between the progress indicator states to allow a user to readily ascertain the difference between the various states.

While FIG. 2 shows/describes various visual indicators for indicating various states or levels of progress in the web page download, other types of indicators can be used in other embodiments. For example, audio indicators could be used in place of, or in combination with, the visual indicators described above. For example, when a first state is achieved in the download progress, a first type of an audible indicator could be played and/or initiated by the web browser. When a threshold amount of content is available for display in the content viewing area of the web browser, a second type of audible indicator could be played to distinguish the new state of the download. And thus, when the download is complete, a third type of audible indicator could be played to indicate that the download is complete. For example, an automated voice could speak, "Content is now being loaded" when the application has begun downloading the content. The audible voice could then say, "Viewable content is available" when viewable content is actually available on the display screen. The audible voice could then say, "Download is complete" when the download is complete. Other types of audible indicators such as, for example, sound effects such as bells, whistles, musical instruments, and other sounds that are distinct from each other could be used to distinguish the various download states.

Figure 3:
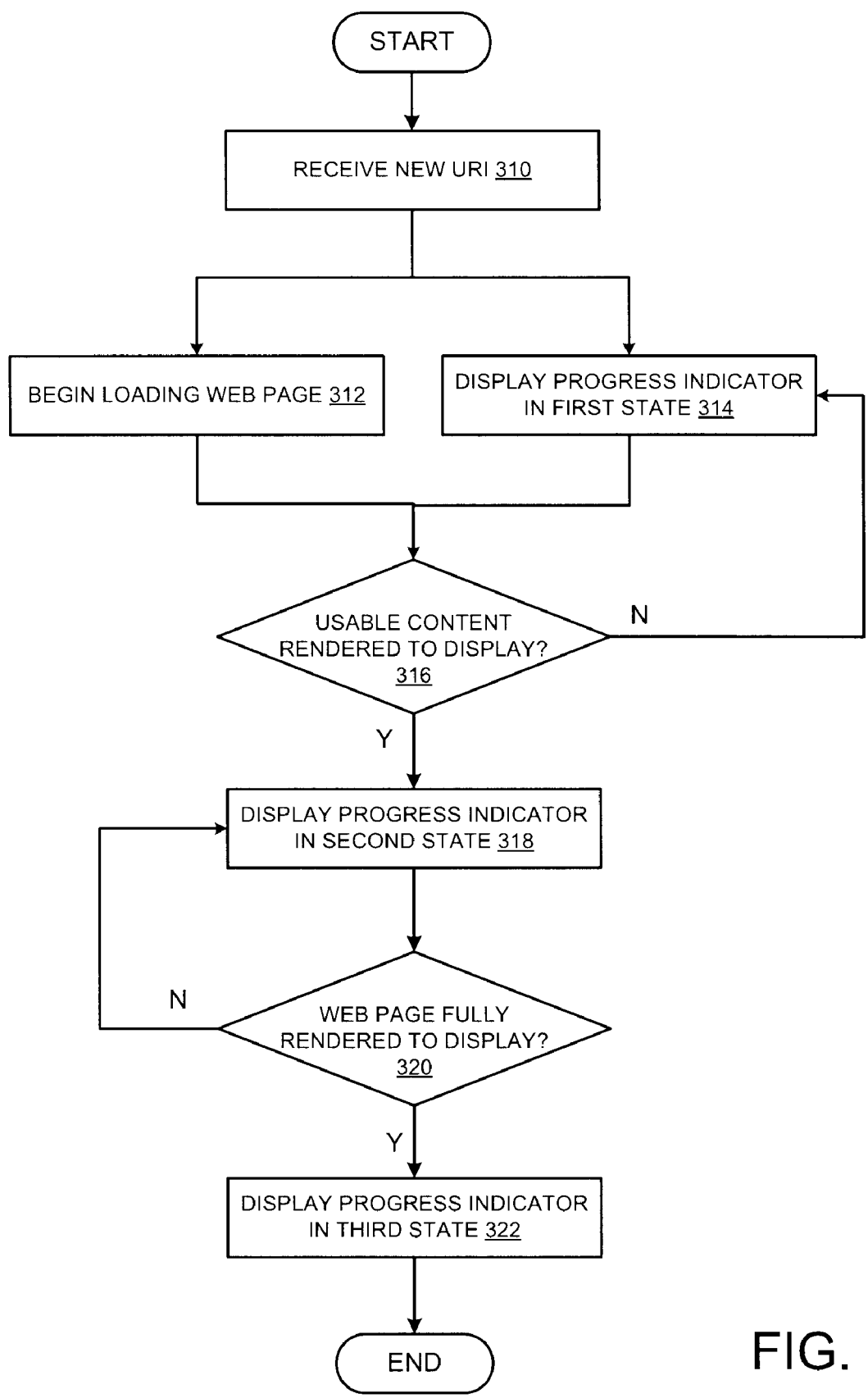
FIG. 3 is a flow diagram according to various embodiments.

FIG. 3 is a flow diagram according to various embodiments. It should be noted that more or fewer steps than those shown in FIG. 3 could be implemented in different embodiments. A new uniform resource identifier (URI) is received 310 by a web browser application. A URI is registered by the web browser whenever a user clicks a link on a web page or when the user enters (e.g., by typing) a new address (e.g., www.apple.com) in a browser address bar. In response, the web browser application begins loading 312 the requested web page and displays 314 a progress indicator in a first state. Loading a requested web page may include the browser requesting the resource from the source in addition to receiving data from the source. Thus, as discussed previously, the first state of the progress indicator may correspond to the initiation request and/or commencement of retrieving data for the requested web page.

The web browser monitors any layouts being generated and it is determined 316 whether any usable content is rendered to the display screen. If there is currently no usable content available (e.g., rendered) to the display screen, then the web browser application continues to display 314 the progress indicator in the first state.

When the web browser application determines that usable content has been rendered to the display screen, then the browser application displays 318 the progress indicator in the second state. In various embodiments, usable content is determined based on the existence of a visually non-empty layout generated by the web browser. In other words, a layout having data associated with it may not necessarily be visually non-empty. However, if the layout includes data that corresponds to text, images, plug-ins, canvas elements, etc., then the browser may determine that the layout is visually non-empty.

While the progress indicator is being displayed in the second state, the application continues to monitor the download of content and/or the layout generation and determines 320 whether the web page is fully rendered to the display. If the web page is not fully rendered to the display, then the application continues to display the progress indicator in the second state 318. If, however, the web page has been fully rendered to the display screen, then the application displays 322 the progress indicator in the third state. The browser may determine that a download is complete based on information indicating that a final packet has been received from the source or that there are no more layouts to be generated or that there are no more layouts to be rendered to the display.

Figure 4:
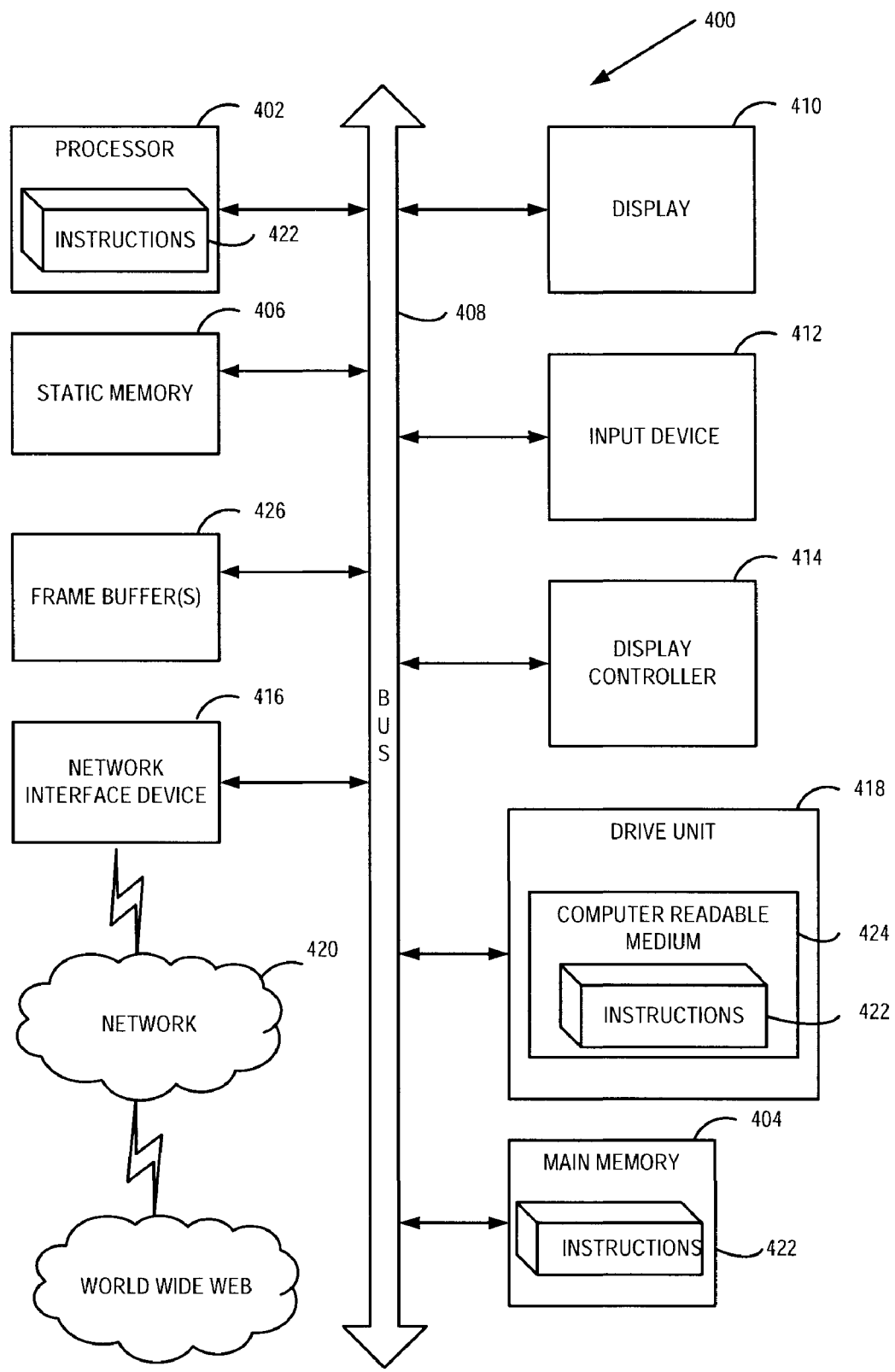
FIG. 4 is a block diagram according to various embodiments.

According to various embodiments, FIG. 4 represents a form of the system that can be used to implement the described details shown in FIGS. 1-3. In particular, it should be noted that display 410 can be used to display user display 100 of FIG. 1. Embodiments of the web browser application described herein may included as instructions 422 (in the system of FIG. 4) that are stored, for example, in drive unit 418 or main memory 404 and can be executed by processor 402.

The exemplary computer system 400 includes a processor 402, a main memory 404 (e.g., read-only memory (ROM), flash memory, dynamic random access memory (DRAM) such as synchronous DRAM (SDRAM) or Rambus DRAM (RDRAM), etc.), a static memory 406 (e.g., flash memory, static random access memory (SRAM), etc.), and a secondary memory 418 (e.g., a data storage device), which communicate with each other via a bus 408.

Processor 402 represents one or more general-purpose processing devices such as a microprocessor, central processing unit, or the like. More particularly, the processor 402 may be a complex instruction set computing (CISC) microprocessor, reduced instruction set computing (RISC) microprocessor, very long instruction word (VLIW) microprocessor, a processor implementing other instruction sets, or processors implementing a combination of instruction sets. Processor 402 may also be one or more special-purpose processing devices such as an application specific integrated circuit (ASIC), a field programmable gate array (FPGA), a digital signal processor (DSP), network processor, or the like. Processor 402 is configured to execute the processing logic 422 for performing the operations and steps discussed herein.

The computer system 400 may further include a network interface device 416. The computer system 400 also may include a display unit 410 (e.g., a liquid crystal display (LCD), light emitting diode (LED) display, a cathode ray tube (CRT)), and an input device 412 (e.g., a keyboard and/or mouse, etc.).

The secondary memory 418 may include a machine-readable storage medium (or more specifically a computer-readable storage medium) 424 on which is stored one or more sets of instructions (e.g., software 422) embodying any one or more of the methodologies or functions described herein. The software 422 may also reside, completely or at least partially, within the main memory 404 and/or within the processing device 402 during execution thereof by the computer system 400, the main memory 404 and the processing device 402 also constituting machine-readable storage media. The software 422 may further be transmitted or received over a network 420 via the network interface device 416. In various embodiments, web content requested by a user can be retrieved (e.g., from the World Wide Web) via network 420 using network interface device 416.

While the machine-readable storage medium 424 is shown in an exemplary embodiment to be a single medium, the terms "machine-readable storage medium" or "computer-readable storage medium" should be taken to include a single medium or multiple media (e.g., a centralized or distributed database, and/or associated caches and servers) that store the one or more sets of instructions. The terms "machine-readable storage medium" or "computer-readable storage medium" shall also be taken to include any medium that is capable of storing or encoding a set of instructions for execution by the machine/computer and that cause the machine/computer to perform any one or more of the methodologies of the present invention. The terms "machine readable storage medium" or "computer-readable storage medium" shall accordingly be taken to include, but not be limited to, solid-state memories, and optical and magnetic media.

Various components described herein may be a means for performing the functions described herein. Each component described herein includes software, hardware, or a combination of these. The operations and functions described herein can be implemented as software modules, hardware modules, special-purpose hardware (e.g., application specific hardware, application specific integrated circuits (ASICs), digital signal processors (DSPs), etc.), embedded controllers, hardwired circuitry, etc.

Aside from what is described herein, various modifications may be made to the disclosed embodiments and implementations of the invention without departing from their scope. Therefore, the illustrations and examples herein should be construed in an illustrative, and not a restrictive sense.

What is claimed is:

1. A machine implemented method for a content viewing application, the method comprising:
    registering a new resource address in response to an input;
    providing an indication after registering the new resource address, the indication having a plurality of discrete states, the plurality of discrete states indicating when a visually empty portion of content has been retrieved from the new resource address and when a visually non-empty portion of content from the resource address has been loaded into a viewing area of the content viewing application to direct attention to the viewing area of the content viewing application, wherein the indication is provided in a portion of an address bar.

2. The method of claim 1, wherein providing an indication further comprises:
    providing a first indicator indicating a first state where no usable portion of content from the resource address is available;
    providing a second indicator indicating a second state where a usable portion of the content from the resource is available; and
    providing a third indicator indicating a state were all of the resource has been loaded into the application and is available.

3. The method of claim 2, wherein providing the indicators comprises providing visual, audible, or a combination of visual and audible indicators.

4. The method of claim 2, wherein at least one of the indicators comprises a color change to a portion of the content viewing application.

5. The method of claim 2, wherein at least one of the indicators comprises a color change to a portion of a uniform resource identifier (URI) input bar in a web browser application.

6. A computer implemented method comprising:
    receiving an input to load a web page in a browser;
    displaying, in response to the input, a selectable button that allows stopping of the loading of the web page;
    displaying a first visual state of the selectable button after the web page is at least partially loaded but before usable content of the web page is displayed;
    determining that at least some of the usable content but less than all of the usable content of the web page has been displayed during the loading of the web page;
    displaying a second visual state of the selectable button in response to determining that at least some of the usable content but less than all of the usable content of the web page has been displayed during the loading of the web page, wherein the selectable button is displayed in a portion of an address bar.

7. The computer implemented method of claim 6, further comprising:
    detecting a current rate at which web page data is being loaded into the web browser;
    displaying a dynamic indicator that reflects the rate at which the web page data is currently being loaded into the web browser.

8. The computer implemented method of claim 7, wherein the dynamic indicator comprises a spinning gear-style representation of the current rate.

9. The computer implemented method of claim 6, wherein usable content comprises one or more of text, an image, a plug-in, and a canvas element.

10. A system with a processor, the system comprising:
    means for registering a new resource address in a content viewing application in response to an input;
    means for providing an indication after registering the new resource address, the indication having a plurality of discrete states, the plurality of discrete states indicating when a visually empty portion of content has been retrieved from the new resource address and when a visually non-empty portion of content from the resource address has been loaded into a viewing area of the content viewing application to direct attention to the viewing area of the content viewing application, wherein the indication is provided in a portion of an address bar.

11. The system of claim 10, wherein the means for providing an indication further comprises:
    means for providing a first indicator indicating a first state where no usable portion of content from the resource address is available;
    means for providing a second indicator indicating a second state where a usable portion of the content from the resource is available; and
    means for providing a third indicator indicating a state where all of the resource has been loaded into the application and is available.

12. The system of claim 11, wherein the means for providing the indicators comprise means for providing visual, audible, or a combination of visual and audible indicators.

13. The system of claim 11, wherein at least one of the indicators comprises a color change to a portion of the content viewing application.

14. The system of claim 11, wherein at least one of the indicators comprises a color change to a portion of a uniform resource identifier (URI) input bar in a web browser application.

15. A non-transitory computer readable storage medium having instructions stored thereon that, when executed, cause a computer to:
- receive an input to load a web page in a web browser;
- render for display, in response to the input, a selectable button that allows stopping of the loading of the web page;
- render for display a first visual state of the selectable button after the web page is at least partially loaded but before usable content of the web page is displayed;
- detect that at least some of the usable content but less than all of the usable content of the web page has been displayed during the loading of the web page;
- render for display a second visual state of the selectable button in response to determining that at least some of the usable content but less than all of the usable content of the web page has been displayed during the loading of the web page, wherein the selectable button is displayed in a portion of an address bar.

16. The non-transitory computer readable storage medium of claim 15, comprising further instructions that cause the computer to:
- detect a current rate at which web page data is being loaded into the web browser;
- display a dynamic indicator that reflects the rate at which the web page data is currently being loaded into the web browser.

17. The non-transitory computer readable storage medium of claim 16, wherein the dynamic indicator comprises a spinning gear-style representation of the current rate.

18. The non-transitory computer readable storage medium of claim 15, wherein usable content comprises one or more of text, an image, a plug-in, and a canvas element.

* * * * *